US010150191B2

(12) United States Patent
Wakisaka et al.

(10) Patent No.: US 10,150,191 B2
(45) Date of Patent: Dec. 11, 2018

(54) TOOL CHANGER

(71) Applicant: DMG MORI CO., LTD., Nara (JP)

(72) Inventors: Dai Wakisaka, Nara (JP); Taketo Kimura, Nara (JP)

(73) Assignee: DMG Mori Co., Ltd., Nara (JP)

( * ) Notice: Subject to any disclaimer, the term of this patent is extended or adjusted under 35 U.S.C. 154(b) by 298 days.

(21) Appl. No.: 15/195,455

(22) Filed: Jun. 28, 2016

(65) Prior Publication Data

US 2017/0066093 A1    Mar. 9, 2017

(30) Foreign Application Priority Data

Sep. 9, 2015 (JP) ................................. 2015-177332

(51) Int. Cl.
*B23Q 3/157* (2006.01)
*B23Q 3/155* (2006.01)

(52) U.S. Cl.
CPC ....... *B23Q 3/15773* (2013.01); *B23Q 3/1554* (2013.01); *B23Q 3/15539* (2016.11); *B23Q 3/1574* (2013.01); *B23Q 3/15724* (2016.11); *B23Q 2003/15532* (2016.11); *B23Q 2003/155414* (2016.11); *B23Q 2003/155428* (2016.11); *B23Q 2003/155439* (2016.11); *Y10T 483/176* (2015.01); *Y10T 483/1755* (2015.01);
(Continued)

(58) Field of Classification Search
CPC ......... Y10T 483/1748; Y10T 483/1753; Y10T 483/1755; Y10T 483/1757; Y10T 483/176; Y10T 483/1767; Y10T 483/1769; B23Q 3/1554; B23Q 3/15573; B23Q 2003/155414; B23Q 2003/155418; B23Q 2003/155428; B23Q 2003/155425; B23Q 2003/155435; B23Q 2003/155439
USPC ...................... 483/36, 38, 39, 40, 41, 44, 45
See application file for complete search history.

(56) References Cited

U.S. PATENT DOCUMENTS

| | | | | |
|---|---|---|---|---|
| 3,256,600 A | * | 6/1966 | Swanson | B23Q 3/15766 483/13 |
| 6,422,099 B1 | * | 7/2002 | Sun | B23Q 3/1554 483/39 |

(Continued)

FOREIGN PATENT DOCUMENTS

| | | | | |
|---|---|---|---|---|
| JP | S47033112 | | 8/1972 | |
| JP | 54-099280 A | * | 8/1979 | ......... B23Q 3/15773 |

(Continued)

*Primary Examiner* — Erica E Cadugan
*Assistant Examiner* — Michael Vitale
(74) *Attorney, Agent, or Firm* — Miller, Matthias & Hull LLP (57) ABSTRACT

A tool changer includes a tool magazine, a support shaft disposed to have a center axis parallel to an axis of a tool spindle, a drive mechanism for rotating the support shaft about the center axis and moving the support shaft in the axial direction, three tool change arms fixed to the support shaft and each having a tool holding unit, a tool transfer mechanism for transferring a tool pot from the tool magazine to a standby position, and a provisional placing pot disposed at a provisional placing position. The tool changer starts a tool change operation in a state where a tool to be attached to the tool spindle, a tool to be used next, and a tool to be used after the next tool are held by the tool holding units of the tool change arms.

4 Claims, 6 Drawing Sheets

(52) U.S. Cl.
CPC .... *Y10T 483/1767* (2015.01); *Y10T 483/1845* (2015.01)

(56) References Cited

U.S. PATENT DOCUMENTS

| | | | |
|---|---|---|---|
| 7,635,327 B1* | 12/2009 | Liao | B23Q 3/15526 483/37 |
| 8,777,823 B2* | 7/2014 | Isozumi | B23Q 3/12 483/39 |
| 2002/0107122 A1* | 8/2002 | Hoppe | B23Q 3/1552 483/46 |
| 2004/0259705 A1* | 12/2004 | Kessler | B23Q 3/1552 483/39 |
| 2011/0177925 A1* | 7/2011 | Mayr | B23Q 1/4876 483/44 |

FOREIGN PATENT DOCUMENTS

| | | | | |
|---|---|---|---|---|
| JP | 06-179142 A | * | 6/1994 | |
| JP | 2005501751 | | 1/2005 | |
| WO | WO 2006050551 A2 | * | 5/2006 | ......... B23Q 3/15526 |

* cited by examiner

TOOL CHANGER

BACKGROUND

Field of the Disclosure

The present disclosure relates to a tool changer that changes a tool attached to a tool spindle of a machine tool with a next tool positioned at a predetermined position.

Background of the Disclosure

Tool changers typically change a tool attached to a tool spindle with a next tool by causing a plurality of tool holding units provided on a tool change arm to hold the tools, and the tool changer is classified into two different types, i.e. so-called swing type and insertion type, based on its behavior for causing the tool holding units to hold the tools.

The swing type tool changer typically includes a tool change arm having a tool holding unit at both ends thereof, which has an opening in an end-side side surface of the tool change arm, a support shaft provided in parallel to a tool spindle of a machine tool for supporting the tool change arm, and a rotation drive motor. Further, the swing type tool changer includes a rotating mechanism that rotates the tool change arm about an axis of the support shaft by using rotational power of the rotation drive motor, an advancing and retreating mechanism that includes an advancing and retreating drive motor and a ball screw, and advances and retreats the tool change arm along the support shaft with the ball screw driven by the advancing and retreating drive motor, and other components.

In this swing type tool changer, first, the tool change arm is rotated about the axis of the support shaft to cause one and the other of the tool holding units of the tool change arm to hold a tool attached to the spindle (first tool) and a next tool (second tool) positioned at a standby position, respectively. Subsequently, the tool change arm is advanced or retreated along the support shaft to pull the first tool out of the tool spindle and the tool change arm is rotated 180 degrees about the axis of the support shaft. Thereafter, the tool change arm is advanced or retreated along the support shaft to attach the second tool to the spindle. Thus, the first tool attached to the tool spindle is changed with the second tool.

Further, as for the above-mentioned insertion type tool changer, an automatic tool changer disclosed in Japanese Examined Patent Application Publication No. S47-33112 has been proposed. This insertion type tool changer includes a spider arm having four arms (first to fourth arms) provided thereon at 90 degree intervals, which arms each have a tool holding unit having an opening in the end surface of the arm, a drive mechanism that rotates the spider arm in a normal direction about a center axis parallel to a tool spindle of a machine tool, and advances and retreats the spider arm along the center axis, a tool transfer mechanism that transfers a tool to a standby position, and other components. When machining a workpiece, it is possible to cause the tool holding units of the first to fourth arms to hold, for example, a tool to be used first (first tool), a tool to be used next (second tool), a tool to be used after the next tool (third tool), and a tool to be used after the after-next tool (fourth tool) in sequence in the opposite direction to the rotating direction of the spider arm in advance.

When tools are changed by this tool changer, first, the first tool holding unit, which is empty because it has passed the tool to the tool spindle, is indexed to a tool change position by rotating the spider arm in the normal direction with the drive mechanism. Subsequently, the first tool attached to the tool spindle is moved to the tool change position so that it enters the first tool holding unit through the opening of the first tool holding unit, and the tool is held by the first tool holding unit. Thereafter, the spider arm is advanced or retreated to pull the tool out of the tool spindle, and then the spider arm is turned 90 degrees about the center axis to position the second tool held by the second tool holding unit in the tool change position and position the tool pulled out of the tool spindle in a standby position. Thereafter, the second tool is attached to the tool spindle by advancing or retreating the spider arm. Thus, the first tool attached to the tool spindle is changed with the second tool. Note that the first tool pulled out of the tool spindle is attached to an appropriate holding unit of the tool transfer mechanism and then stored into a tool magazine by the tool transfer mechanism.

SUMMARY OF THE DISCLOSURE

In the above-described conventional swing type tool changer, after the first tool is changed with the second tool, the first tool that used to be attached to the tool spindle is stored into an appropriate tool magazine and a third tool to be used after the second tool is positioned in the standby position. After a machining operation using the second tool is finished, the second tool is changed with the third tool.

Note that machining time required for one tool can be long or extremely short. Therefore, the machining time required for the second tool can be much shorter than the time required until the third tool is moved to the standby position. In such a case, when the machining operation using the second tool has been finished, the second tool has to wait until the third tool is positioned in the standby position before being changed with the third tool, and therefore a waiting time occurs, which leads to a problem that machining time is prolonged.

On the other hand, in the above-described conventional insertion type tool changer, because it has four tool holding units, it is possible to cause the tool holding units to hold the second tool, the third tool, and the fourth tool in advance as described above. Therefore, even if a machining operation using the second tool is finished in a short time, the second tool can be changed with the third tool without the occurrence of a waiting time. Accordingly, the problem of prolonged machining time is less likely to occur.

By the way, nowadays, the swing type tool changer, rather than the insertion type tool changer, is the widely used because it has the advantage that it is capable of changing tools quickly. Accordingly, if, in view of the above fact, the shape of the spider arm of the above-described conventional insertion type tool changer is changed to a shape corresponding to the swing type tool changer, a tool attached to the tool spindle is changed with another tool in the following manner.

First, the spider arm is rotated to cause the first tool holding unit to hold the first tool attached to the tool spindle, and then the first tool is pulled out of the tool spindle. Subsequently, the spider arm is rotated 90 degrees to move the first tool to the standby position and move the second tool held by the second tool holding unit to the tool change position, and then the first tool is passed to an appropriate holding unit of the tool transfer mechanism and the second tool is attached to the tool spindle. Thus, the first tool is changed with the second tool. The tool transfer mechanism puts the first tool passed thereto into the tool magazine, and moves a fifth tool to be used after the fourth tool from the tool magazine to the standby position.

In this process, for example, if the machining operation using the second tool is finished immediately after the fifth tool is held by the first tool holding unit, the spider arm, which is in a state where the fifth tool is held by the first tool holding unit, has to be rotated approximately 360 degrees to swing the second tool holding unit toward the second tool to cause the second tool holding unit to hold the second tool. Therefore, in terms of making the time required for tool change as short as possible, it cannot be said that provision of a plurality of swing type arms alone is sufficient.

The present disclosure has been achieved in view of the above-described circumstances, and an object thereof is to provide a swing type tool changer which is capable of minimizing a waiting time and thereby changing tools in a short time.

The present disclosure, for solving the above problem, relates to a tool changer disposed at a tool change position in a machine tool for changing a tool attached to a spindle with a next tool, including:
- a support shaft disposed to have a center axis parallel to an axis of the spindle and provided to be rotatable about the center axis and to be movable in approaching and separating directions relative to the spindle, the approaching and separating directions being parallel to the axis of the spindle;
- a drive mechanism for rotating the support shaft in normal and reverse directions about the center axis and moving the support shaft in the approaching and separating directions along the axis of the spindle;
- a tool change arm disposed on the support shaft to extend in a radial direction with respect to the center axis of the support shaft in a plane perpendicular to the center axis, having a tool holding unit, and holding a tool with the tool holding unit in such a manner that an axis of the tool is parallel to the center axis of the support shaft, the tool holding unit having an opening in one of side surfaces of the tool change arm in the normal and reverse directions for rotating the support shaft;
- a tool magazine holding a plurality of tools;
- a standby position pot provided at a position for taking a tool in and out of the tool magazine for holding the tool, the position corresponding to a turning circle followed by the tool holding unit of the tool change arm; and
- a tool transfer mechanism for transferring a tool between the tool magazine and the standby position pot, the tool changer including at least three said tool change arms in a common plane perpendicular to the center axis of the support shaft, the tool holding units of the tool change arms being positioned on a common pitch circle having its center on the center axis of the support shaft, and rotating the support shaft causing a tool attached to the spindle to be held by the tool holding unit of one of the tool change arms and a tool held by the standby position pot to be held by the tool holding unit of another one of the tool change arms.

According to this tool changer, the support shaft is rotated in a direction to swing the tool holding unit of the one of the tool change arms on a tool attached to the spindle through the opening of the one of the tool holding units (normal direction), and then the support shaft is moved in a direction to pull the tool out of the spindle, whereby the tool attached to the spindle is detached from the spindle in a state of being held by the one of the tool holding units. Further, the support shaft is rotated in a direction to swing the tool holding unit of the another one of the tool change arms on a tool held by the standby position pot through the opening of the another one of the tool holding units, and then the support shaft is moved in a direction to pull the tool out of the standby position pot, whereby the tool held by the standby position pot is detached from the standby position pot in a state of being held by the another one of the tool holding units. Note that, in a case where the tool changer is configured so that the tool holding unit of the another one of the tool change arms is positioned in a position corresponding to the standby position pot when the tool holding unit of the one of the tool change arms is positioned in a position corresponding to the spindle, the holding of the tool attached to the spindle by the one of the tool holding units and the holding of the tool held by the standby position pot by the another one of the tool holding units take place simultaneously.

Because this tool changer includes at least three tool change arms, the tool changer is capable of holding as many tools as the number of the tool change arms simultaneously.

Accordingly, for example, in a case where a machining operation using a tool attached to the spindle is finished before a tool to be used next (next tool) is transferred to the standby position pot from the tool magazine, if the next tool is caused to be held by one of the tool holding units other than the one of the tool holding units in advance before the machining operation is started, it is possible to index the tool holding unit holding the next tool to the position corresponding to the spindle and attach the next tool to the spindle after the tool attached to the spindle is detached from the spindle in a state of being held by the one of the tool holding units, and, during a machining operation using the next tool, cause the tool that used to be attached to the spindle to be held by the standby position pot or cause the tool held by the standby position pot to be held by one or more of the remaining tool holding units. Therefore, the tool attached to the spindle can be changed with the next tool without the occurrence of a waiting time; the time required for machining can be made shorter.

Further, since the drive mechanism is configured to rotate the support shaft in the normal and reverse directions, the rotating direction of the support shaft can be controlled so as to minimize the amount of rotation of the support shaft when a predetermined tool holding unit is swung on a tool attached to the spindle or a tool held by the standby position pot to cause the tool to be held by the tool holding unit.

That is, when a tool attached to the spindle is caused to be held by the one of the tool holding units, in a case where the one of the tool holding units is positioned in the tool change position at the time, the support shaft can be rotated in the opposite direction to the direction to swing the tool holding unit on the tool though the opening of the tool holding unit (reverse direction) to take a run-up to swinging the one of the tool holding units on the tool attached to the spindle before the support shaft is rotated in the normal direction to swing the one of the tool holding units on the tool attached to the spindle. Therefore, as compared with a case where the support shaft is configured to be rotated only in one direction, the amount of rotation of the support shaft is smaller; consequently, the time required for tool change can be made still shorter.

Note that it is preferred that the tool changer is able to simultaneously hold at least a tool attached to the spindle, a tool to be used next, and a tool to be used after the next tool with the tool holding units of the tool change arms in a one-to-one manner.

In such a configuration, in a case where a next tool and a tool to be used after the next tool (tool after next) are respectively caused to be held by the another one of the tool holding units and one of the remaining tool holding units in advance, and, after a tool attached to the spindle is changed with the next tool, a short-time machining operation using the next tool and then a machining operation using the tool after next are performed, the next tool attached to the spindle can be caused to be held by the another one of the tool holding units in a state where the tool that used to be attached to the spindle is held by the one of the tool holding units and the tool after next is held by the one of the remaining tool holding units. Thus, it is possible to simultaneously hold at least three tools in a one-to-one manner. Therefore, thereafter, it is possible to position the one of the remaining tool holding units in the position corresponding to the spindle and attach the tool after next to the spindle immediately without causing the tool held by the one of the tool holding units to be held by the standby position pot; the tool held by the one of the tool holding units can be caused to be held by the standby position pot during the machining operation using the tool after next. Thus, it is possible to minimize the waiting time.

Further, in this tool changer, the tool change arms may be spaced apart at equal intervals or at unequal intervals along the rotating direction of the support shaft. However, it is preferred that the tool change arms are spaced apart at equal intervals so that the holding of a tool attached to the spindle by one of the tool holding units and the holding of a tool held by the standby position pot by another one of the tool holding units take place simultaneously. Note that, in such a case, the intervals between the tool change arms are equal to the interval between the tool change position and the standby position.

By the way, a tool changer typically has provided therein a mechanism for non-releasably locking a tool held by the tool holding unit to prevent the tool from falling off from the tool holding unit when the support shaft is rotated.

However, in a case where a tool attached to the spindle, a next tool, and a tool after next are simultaneously held by the tool holding units of the tool change arms in a one-to-one manner, a mechanism is required which non-releasably locks only the tool after next held by one of the tool holding units to prevent the tool after next from falling off from the tool holding unit when the tool attached to the spindle is caused to be held by the standby position pot and the next tool is attached to the spindle, which makes the configuration complicated.

Accordingly, in the above-described tool changer, in the case where the tool change arms are spaced apart at equal intervals, it is preferred that, when the tool holding unit of the one of the change arms is positioned at the position corresponding to the spindle, at least the tool holding unit of another one of the tool change arms is positioned at the position corresponding to the standby position pot, and a provisional placing pot is disposed in a position which, when the one and the another one of the tool holding units are thus positioned, corresponds to the tool holding unit of the remaining tool change arm, to hold a tool held by the tool holding unit.

In such a configuration, it is possible to cause the tool after next to be temporarily held by the provisional placing pot. Therefore, it is not necessary to provide a locking mechanism which non-releasably locks only the tool after next held by the tool holding unit; the configuration of the tool changer can be made simple.

Note that examples of the locking mechanism for locking a tool in each of the tool holding units includes a mechanism which allows the holding of a tool by the tool holding unit to be released at least when the support shaft approaches the spindle, and non-releasably locks the holding of a tool by the tool holding unit when it is not allowed to be released; the locking mechanisms for the tool holding units synchronously operate.

As described above, according to the tool changer of the present disclosure, since at least three tool change arms are provided and the support shaft is configured to be rotated in the normal and reverse directions, it is possible to efficiently change tools in such a manner that the occurrence of a waiting time is minimized, and it is also possible to make the time required for tool change itself shorter. Consequently, it is possible to make machining time shorter.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Hereinafter, a specific embodiment of the present disclosure will be described with reference to the drawings.

As shown in FIGS. 1 to 4, a tool changer 1 according to this embodiment is provided in a machine tool 50, e.g. a combined machining apparatus, and the tool changer 1 is composed of a tool magazine 2 in which a plurality of tools are held, a support shaft 10 disposed to have a center axis parallel to an axis of a tool spindle 51 of the machine tool 50, a drive mechanism 13 for rotating the support shaft 10 about the center axis and moving the support shaft 10 in an approaching and separating directions relative to the tool spindle 51 along the axis of the tool spindle 51, first, second, and third tool change arms 15a, 15b, and 15c which are provided on the support shaft 10 and are each configured to hold a tool T with a tool holding unit 16 provided on a distal end portion thereof, a locking mechanism 25 for locking the state of the holding of the tool T by the tool holding unit 16 of each of the tool change arms 15a, 15b, and 15c, a provisional placing pot 41 supported by an appropriate support member, and a tool transfer mechanism 45 for transferring the tools from the tool magazine 2 to a predetermined standby position. Note that the components other than the tool spindle 51 in the machine tool 50 are omitted in FIG. 1; however, the machine tool 50 includes a bed, a table disposed on the bed, a chuck for holding a workpiece, a feed mechanism for moving the tool spindle 51, a rotation drive mechanism for rotating the tool spindle 51, and other components besides the tool spindle 51.

The tool magazine 2 is composed of a plurality of tool pots 3 each holding a tool, a driving roller 4 disposed to have an axis along a horizontal direction, a driven roller 5 disposed below the driving roller 4 to have an axis along the horizontal direction, a drive motor 6 rotating the driving roller 4 about the axis thereof, an endless belt 7 wound around the two rollers 4 and 5, and a plurality of holding bases 8 disposed at regular intervals on an outer peripheral surface of the endless belt 7 for holding the tool pots 3. The endless belt 7 is turned by rotating the drive motor 6, whereby one of the tool pots 3 held by the holding bases 8 which is holding a desired tool is indexed to an index position that is defined above the driving roller 4. Not that the tool pots 3 other than the tool pot 3 indexed to the index position and adjacent tool posts 3 on both sides of the indexed tool pot 3 are omitted in FIG. 1.

The support shaft 10 has an containing hole 11 formed therein which is open to an end surface of the support shaft 10 located far from the tool spindle 51; a regulating rod 31 of the locking mechanism 25, which is described later, is contained in the containing hole 11. Further, the support shaft 10 has three through holes 12 formed therein, through which the containing hole 11 communicates with the outside and in which biasing rods 26, which are described later, are inserted.

The drive mechanism 13 is composed of a drive motor (not shown) coupled to an end (rear end) of the support shaft 10 located far from the tool spindle 51 for rotating the support shaft 10, a rotary encoder (not shown) coupled to the drive motor for detecting an angular position of the support shaft 10 based on the rotational position of the drive motor, an actuator (not shown) moving the support shaft 10 forward and backward, and other components, and is supported by an appropriate structure of the machine tool 50. Further, when the support shaft 10 is rotated by the drive mechanism 13, the three tool change arms 15a, 15b, and 15c are turned, while when the support shaft 10 is moved forward or backward, the three tool change arms 15a, 15b, and 15c are moved in the same direction as the support shaft 10.

Next, the first, second, and third tool change arms 15a, 15b, and 15c are described. These three tool change arms 15a, 15b, and 15c have the same configuration; therefore, the components common to the tool change arms 15a, 15b, and 15c are denoted by the same references in the following description.

The first, second, and third tool change arms 15a, 15b, and 15c are fixed on the outer peripheral surface of the support shaft 10 at their respective rear end sides; the rear end sides of the tool change arms 15a, 15b, and 15c are fixed on the outer peripheral surface of the support shaft 10 so that the tool change arms 15a, 15b, and 15c are spaced apart at equal intervals, i.e. at approximately 120 degree intervals in this embodiment, along the rotating direction of the support shaft 10.

Further, each of the tool holding units 16 of the tool change arms 15a, 15b, and 15c is composed of a fixed jaw 17 that is formed on the distal end of the tool change arm 15a, 15b, 15c and has an arcuate shape in plan view, and a movable jaw 18 supported on the body of the tool change arm 15a, 15b, 15c by a pin 20 in a state of facing the fixed jaw 17 and the movable jaw 18 is configured to pivot about the pin 20. Note that the body of each tool change arm 15a, 15b, 15c has a guide hole 19 formed therein which is open to the rear end surface of the tool change arm 15a, 15b, 15c and is open to a portion of the tool change arm 15a, 15b, 15c facing the movable jaw 18.

The locking mechanism 25 is composed of the biasing rods 26 each of which has a large diameter portion 27 formed on one end side thereof and a small diameter portion 28 formed on the other end side thereof and which are forward and backward movably contained in the guide holes 19 of the tool change arms 15a, 15b, and 15c, respectively, with the distal ends of the large diameter portions 27 each being connected to the movable jaw 18 via a link member 29, and the regulating rod 31 which is forward and backward movably contained in the containing hole 11 of the support shaft 10 and regulates the backward movement of the biasing rods 26.

Each of the biasing rods 26 has a biasing spring 30 wound around the small diameter portion 28 thereof and is configured so that a biasing force of the biasing spring 30 is transmitted from the distal end of the large diameter portion 27 to the movable jaw 18 through the link member 29, whereby the movable jaw 18 is pivoted toward the fixed jaw 17 about the pin 20 and brought into a biased state.

The regulating rod 31 has a small diameter portion 32 and a large diameter portion 33 formed thereon which are formed in sequence from the end near the tool spindle 51 (distal end) of the regulating rod 31. Further, the regulating rod 31 has a containing hole 34 formed therein which is open to the distal end surface of the regulating rod 31. A biasing spring 35 is disposed in the containing hole 34 and one end of the biasing spring 35 is in contact with an inner wall surface of the containing hole 11 of the support shaft 10.

Figure 1:
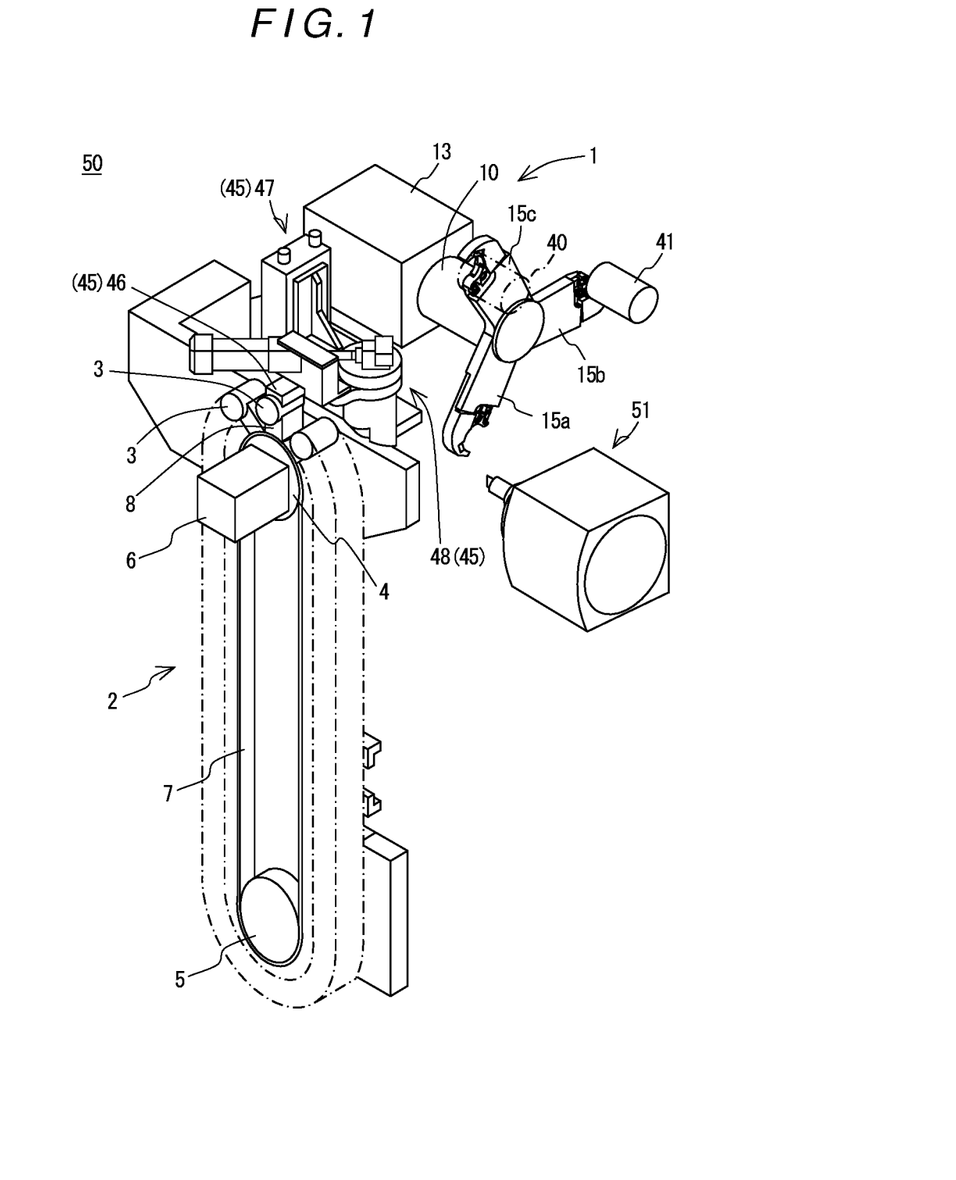
FIG. 1 is a perspective view showing a schematic configuration of a machine tool including a tool changer according to an embodiment of the present disclosure.
Figure 2:
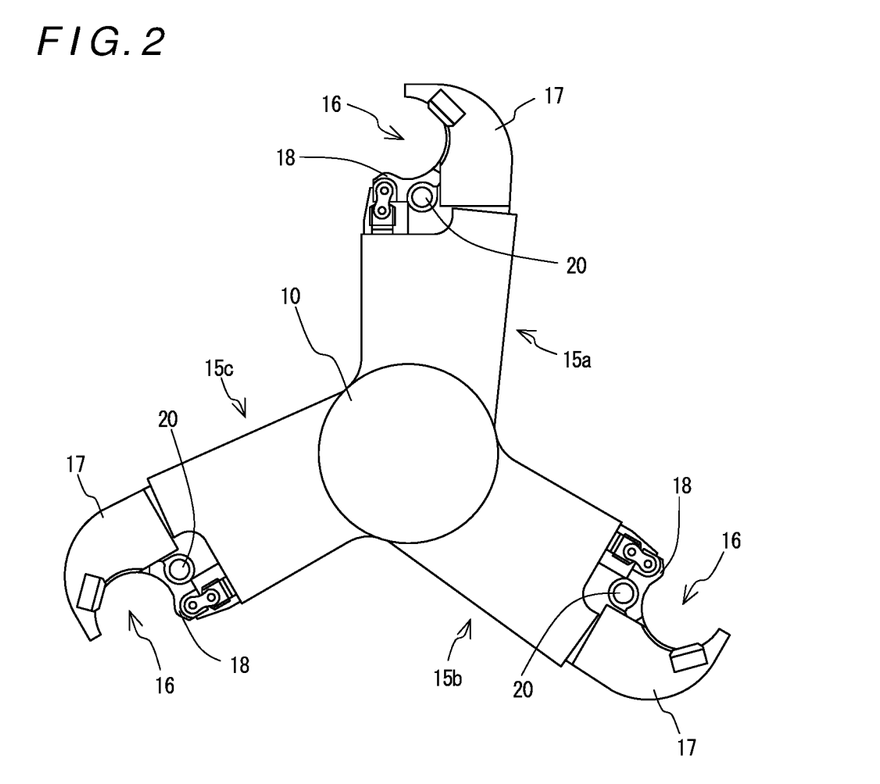
FIG. 2 is a front view showing tool change arms of the tool changer according to the embodiment.
Figure 3:
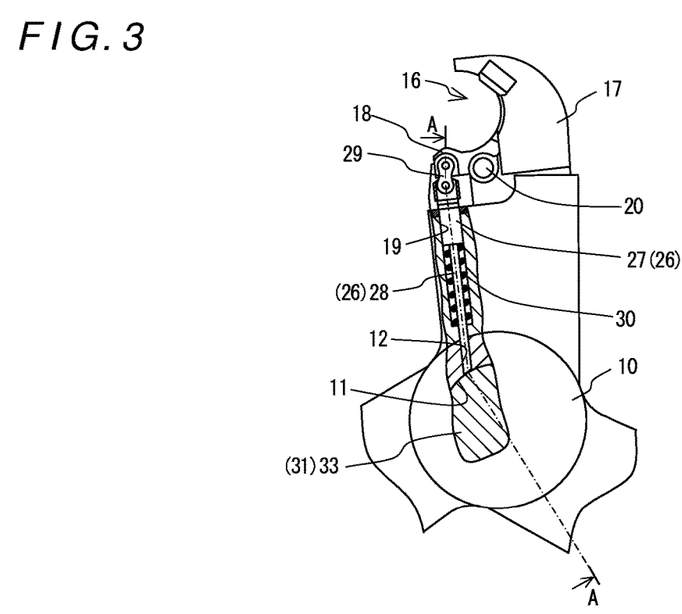
FIG. 3 is a front view showing a partial sectional view of the tool change arm of the tool changer according to the embodiment.
Figure 4:
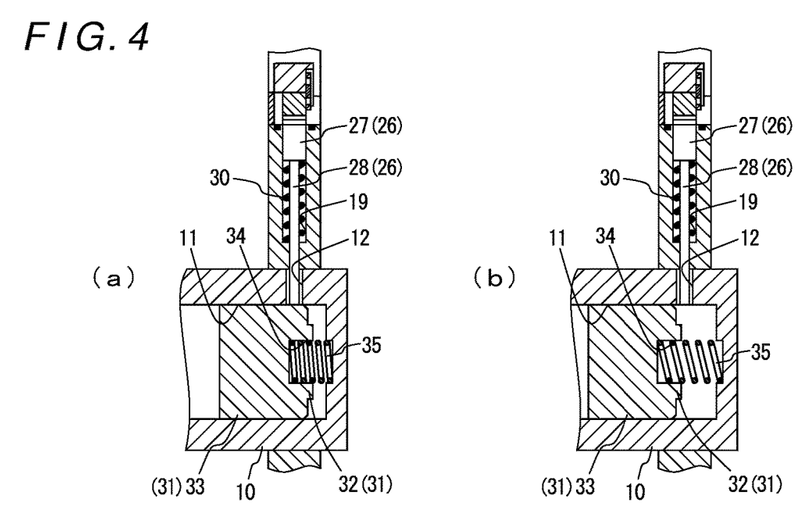
FIG. 4 shows sectional views taken along the arrows A-A in FIG. 3; (a) is a view showing a state where holding of a tool is non-releasably locked and (b) is a view showing a state where holding of a tool is allowed to be released.

As shown in FIG. 4(a), in a state where the support shaft 10 has been moved in the separating direction relative to the tool spindle 51 and thereby is positioned at a position to pull a tool held by the tool holding unit 16 of the tool change arm 15a, 15b, 15c out of at least one of the tool spindle 51, the tool pot 3 in a standby position pot 40, and the provisional placing pot 41 (hereinafter, referred to as "pulling position"), and an appropriate pressing member is pressed on the rear end surface of the large diameter portion 33 with a force not less than the biasing force, the rear end surface of the small diameter portion 28 of the biasing rod 26 is in contact with the outer peripheral surface of the large diameter portion 33 of the regulating rod 31, which regulates the backward movement of the biasing rod 26 and brings the biasing rod 26 into a state where the movable jaw 18 of the tool change arm 15a, 15b, 15c is fixed (locked state).

On the other hand, as shown in FIG. 4(b), in a state where the support shaft 10 has been moved in the approaching direction relative to the tool spindle 51 and thereby is positioned at a position to insert a tool held by the tool holding unit 16 of the tool change arm 15a, 15b, 15c into at least one of the tool spindle 51, the tool pot 3 in the standby position pot 40, and the provisional placing pot 41 (hereinafter, referred to as "inserting position"), and the regulating rod 31 is biased in the backward direction by the biasing spring 35, the contact of the rear end surface of the small diameter portion 28 of the biasing rod 26 with the outer peripheral surface of the large diameter portion 33 of the regulating rod 31 is released, which releases the regulation of the backward movement of the biasing rod 26 and brings the biasing rod 26 into a state where the locking of the movable jaw 18 is released (released state).

The tool transfer mechanism 45 is disposed between the tool magazine 2 and the tool change arms 15a, 15b, and 15c, and includes a griping arm 46 griping a tool pots 3, a lifting mechanism 47 for moving the griping arm 46 in the vertical direction, a turning mechanism 48 for turning the griping arm 46 in a horizontal plane, and other components. In the tool transfer mechanism 45, one of the plurality of tool posts 3 held by the tool magazine 2 which is held by a holding base 8 indexed at the index position is gripped by the gripping arm 46, and then the lifting mechanism 47 and the turning mechanism 48 transfers the tool pot 3 gripped by the gripping arm 46 to a position corresponding to a turning circle followed by the tool holding units 16 of the tool change arms 15a, 15b, and 15c, and positions the tool pot 3 in the position. Further, by actions of the movement of the lifting mechanism 47 and the turning mechanism 48, a tool pot 3 disposed at the standby position is transferred to an empty holding base 8 indexed at the indexing position.

Further, the provisional placing pot 41 is supported at a position corresponding to the turning circle followed by the tool holding units 16 by an appropriate support member.

Further, the position to which the tool spindle 51 is moved for changing the tool attached thereto with another tool (hereinafter, referred to as "tool change position"), the position in which a tool pot 3 is positioned by the tool transfer mechanism 45 (hereinafter, referred to as "standby position"), and the position at which the provisional placing pot 41 is disposed (hereinafter, referred to as "provisional placing position") are defined at equal intervals on the turning circle. For example, when the tool holding unit 16 of the first tool change arm 15a is positioned at the tool change position, the tool holding unit 16 of the second tool change arm 15b and the tool holding unit 16 of the third tool change arm 15c are positioned at the standby position and the provisional placing position, respectively. Note that a tool pot 3 positioned in the standby position by the tool transfer mechanism 45 is referred to as "standby position pot 40" in the following description.

Next, a process of machining a workpiece by using first to fifth tools T1, T2, T3, T4, and T5 in sequence while changing the tools with the tool changer 1 is described below with reference to FIGS. 5 and 6. Note that the tool spindle 51 and the standby position pot 40 are indicated by broken-line circles in FIGS. 5 and 6. Further, in the following description, rotating the support shaft 10 in the clockwise direction with respect to the figures, in other words, the direction to swing the tool holding units 16 of the tool change arms 15a, 15b, and 15c on tools, is expressed as "rotating the support shaft 10 in the normal direction", and rotating the support shaft 10 in the counterclockwise direction, in other words, the direction to release the holding of tools by the tool holding units 16 of the tool change arms 15a, 15b, and 15c, is expressed as "rotating the support shaft 10 in the reverse direction". Furthermore, in the following description, the tool holding unit 16 of the first tool change arm 15a is referred to as "first tool holding unit", the tool holding unit 16 of the second tool change arm 15b is referred to as "second tool holding unit", and the tool holding unit 16 of the third tool change arm 15c is referred to as "third tool holding unit", and the machining of the workpiece is started in a state where the first tool T1, the second tool T2, and the third tool T3 are held by the first tool holding unit, the second tool holding unit, and the third tool holding unit, respectively.

First, the tool spindle 51 is moved to the tool change position, and the support shaft 10 is rotated in the normal direction in a state of having been moved to the pulling position, whereby the first tool holding unit is positioned to the tool change position. Note that, at this time, the second tool holding unit and the third tool holding unit are positioned to the provisional placing position and the standby position, respectively, and, because the support shaft 10 has been moved to the pulling position, the holding of the tools held by the tool holding units is non-releasably locked so as to prevent the tools from falling off from the tool holding units.

Thereafter, the support shaft 10 is moved to the inserting position, whereby the first tool T1 is attached to the tool spindle 51, the second tool T2 held by the second tool holding unit is held by the provisional placing pot 41, and the third tool T3 held by the third tool holding unit is held by the standby position pot 40. Subsequently, the support shaft 10 is rotated in the reverse direction until the first tool holding unit is positioned in a position at which it does not interfere with the first tool T1, and then the tool spindle 51 is moved to a predetermined position and a machining operation using the first tool T1 is performed on the workpiece. Note that, because the support shaft 10 has been moved to the inserting position, the holding of the tools held by the tool holding units is in a releasable state, and therefore the holding of the tools held by the tool holding units is released when the support shaft 10 is rotated in the reverse direction.

Once the machining operation using the first tool T1 is finished, the tool spindle 51 is moved to the tool change position and then the support shaft 10 is rotated in the normal direction, whereby the first tool holding unit is swung on the first tool T1 and the first tool T1 is held by the first tool holding unit. At this time, the second tool holding unit and the third tool holding unit are swung on the second tool T2 and the third tool T3, respectively, and the second tool T2 and the third tool T3 are held by the second tool holding unit and the third tool holding unit, respectively. Subsequently, the support shaft 10 is moved to the pulling position, whereby the first tool T1, the second tool T2, and the third tool T3 are pulled out of the tool spindle 51, the provisional placing pot 41, and the standby position pot 40, respectively. Thereafter, as shown in FIG. 5(a), the support shaft 10 is rotated in the normal direction to move the second tool holding unit to the tool change position. Thereby, the first tool holding unit and the third tool holding unit are positioned in the standby position and the provisional placing position, respectively (see FIG. 5(b)).

Figure 5:
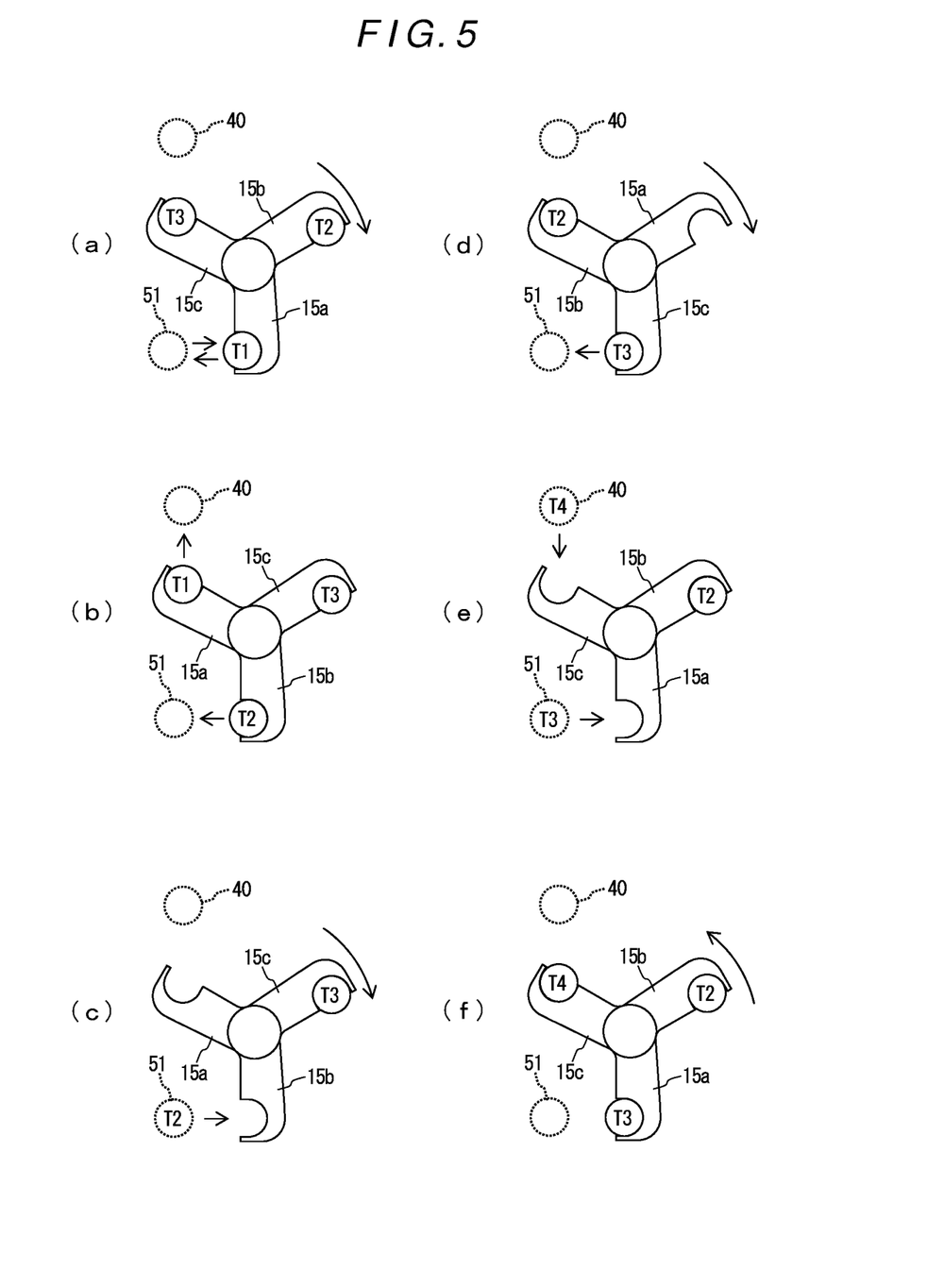
FIG. 5 is an illustration for describing a tool changing process performed by the tool changer according to the embodiment.

Subsequently, as shown in FIG. 5(b), the support shaft 10 is moved to the inserting position, whereby the first tool T1 is held by the standby position pot 40 and the second tool T2 is attached to the tool spindle 51. Thereafter, the support shaft 10 is rotated in the reverse direction so that the second tool holding unit is positioned in a position at which it does not interfere with the second tool T2. Thereafter, the tool spindle 51 is moved to a predetermined position and a machining operation using the second tool T2 is started, and the standby position pot 40 holding the first tool T1 is transferred to the tool magazine 2 by the tool transfer mechanism 45 and held in the tool magazine 2. Note that the third tool T3 remains held by the provisional placing pot 41 during this process.

After the machining operation using the second tool T2 is finished, the tool spindle 51 is moved to the tool change position and the support shaft 10 is rotated in the normal direction, whereby the second tool holding unit and the third tool holding unit are swung on the second tool T2 and the third tool T3, respectively, and the second tool T2 and the third tool T3 are held by the second tool holding unit and the third tool holding unit, respectively. Subsequently, the support shaft 10 is moved to the pulling position, whereby the second tool T2 and the third tool T3 are pulled out of the tool spindle 51 and the provisional placing pot 41, respectively.

Thereafter, as shown in FIG. 5(c), the support shaft 10 is rotated in the normal direction to move the second tool holding unit and the third tool holding unit to the standby position and the tool change position, respectively (see FIG. 5(d)).

Subsequently, the support shaft 10 is moved to the inserting position to attach the third tool T3 to the tool spindle 51 (see FIG. 5(d)). Thereafter, the tool spindle 51 is moved in the direction to pull the third tool T3 out of the third tool holding unit and moved to a predetermined position, and then a machining operation using the third tool T3 is started. During the machining operation using the third tool T3, the support shaft 10 is moved to the pulling position and is rotated in the normal direction until the second tool holding unit is positioned in the provisional placing position, and the support shaft 10 is moved to the inserting position to cause the second tool T2 to be held by the provisional placing pot 41, and then the support shaft 10 is rotated in the reverse direction to a predetermined position so that the holding of the second tool T2 by the second tool holding unit is released. Further, during the machining operation using the third tool T3, a tool pot 3 holding the forth tool T4 is transferred to the standby position by the tool transfer mechanism 45 (see FIG. 5(e)).

After the machining operation using the third tool T3 is finished, the tool spindle 51 is moved to the tool change position and the support shaft 10 is rotated in the normal direction, whereby the first tool holding unit is swung on the third tool T3 and the third tool T3 is held by the first tool holding unit, the third tool holding unit is swung on the fourth tool T4 held by the standby position pot 40 and the fourth tool T4 is held by the third tool holding unit, and the second tool holding unit is swung on the second tool T2 held by the provisional placing pot 4 and the second tool T2 is held by the second tool holding unit. Subsequently, the support shaft 10 is moved to the pulling position to pull the third tool T3 out of the tool spindle 51, pull the fourth tool T4 out of the standby position pot 40, and pull the second tool T2 out of the provisional placing pot 41 (see FIG. 5(e)). Thereafter, as shown in FIG. 5(f), the support shaft 10 is rotated in the reverse direction to move the third tool holding unit to the tool change position, move the second tool holding unit to the standby position, and move the first tool holding unit to the provisional placing position (see FIG. 6(a)).

Subsequently, the support shaft 10 is moved to the inserting position, whereby the fourth tool T4 is attached to the tool spindle 51, the second tool T2 is held by the standby position pot 40, and the third tool T3 is held by the provisional placing pot 41 (see FIG. 6(b)). Subsequently, the support shaft 10 is rotated in the reverse direction until the third tool holding unit is positioned in a position at which it does not interfere with the fourth tool T4, and then the tool spindle 51 is moved to a predetermined position and a machining operation using the fourth tool T4 is started. Note that, during the machining operation using the fourth tool T4, the standby position pot 40 holding the second tool T2 is transferred to the tool magazine 2 by the tool transfer mechanism 45, and then a tool pot 3 holding the fifth tool T5 is indexed to the index position in the tool magazine 2 and the tool pot 3 is transferred to the standby position (see FIG. 6(c)).

After the machining using the fourth tool T4 is finished, the tool spindle 51 is moved to the tool change position and the support shaft 10 is rotated in the normal direction, whereby the third tool holding unit is swung on the fourth tool T4 and the forth tool T4 is held by the third tool holding unit, the second tool holding unit is swung on the fifth tool T5 and the fifth tool T5 is held by the second tool holding unit, and the first tool holding unit is swung on the third tool T3 and the third tool T3 is held by the first tool holding unit. Thereafter, the support shaft 10 is moved to the pulling position to pull the fourth tool T4 out of the tool spindle 51, pull the fifth tool T5 out of the standby position pot 40, and pull the third tool T3 out of the provisional placing pot 41 (see FIG. 6(c)). Thereafter, as shown in FIG. 6(d), the support shaft 10 is rotated in the reverse direction to move the second tool holding unit to the tool change position, move the first tool holding unit to the standby position, and the third tool holding unit to the provisional placing position.

Figure 6:
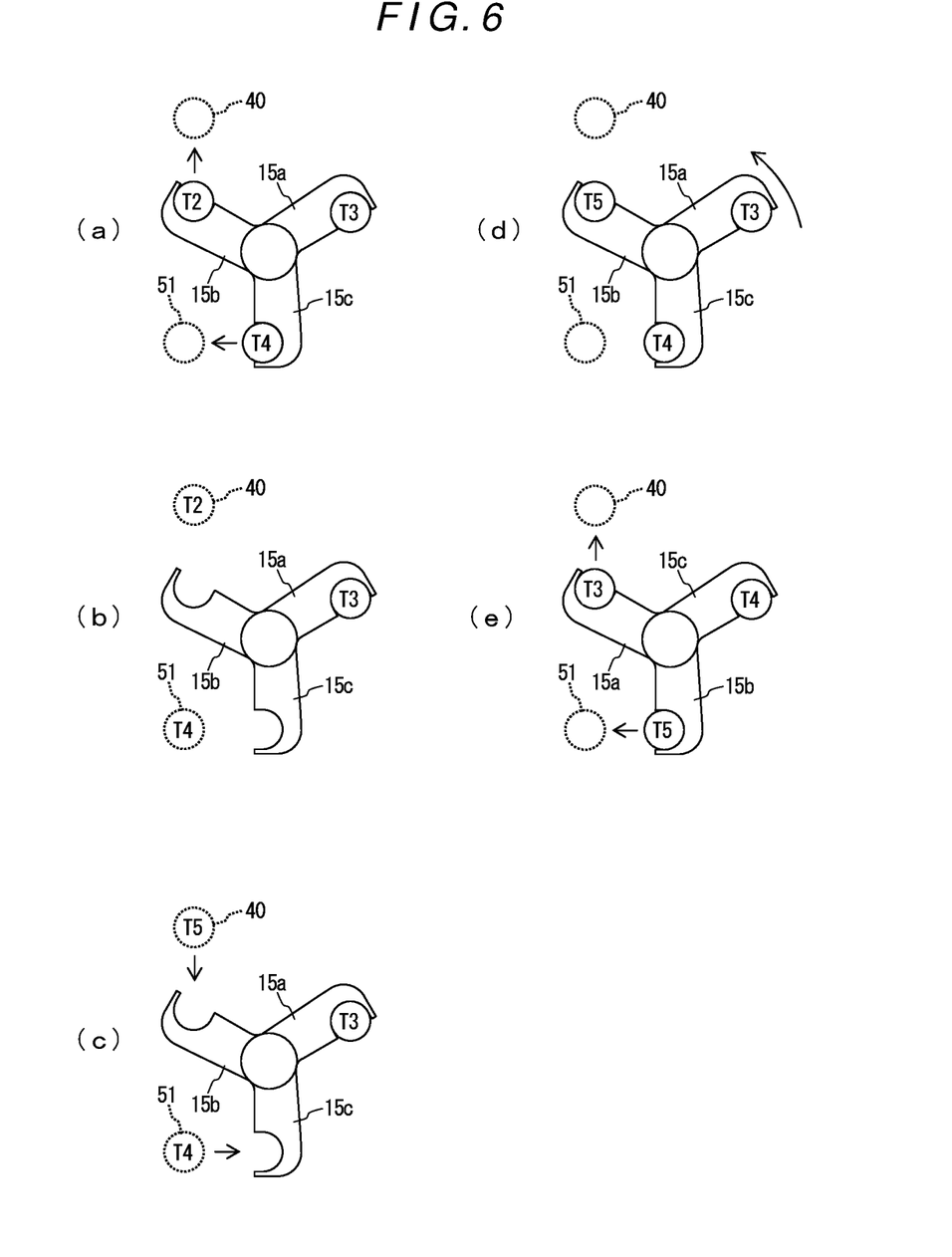
FIG. 6 is an illustration for describing the tool changing process performed by the tool changer according to the embodiment.

Next, the support shaft 10 is moved to the inserting position, whereby the fifth tool T5 is attached to the tool spindle 51, the third tool T3 is held by the standby position pot 40, and the fourth tool T4 is held by the provisional placing pot 41 (FIG. 6(e)). Subsequently, the support shaft 10 is rotated in the reverse direction until the second tool holding unit is positioned in a position at which it does not interfere with the fifth tool T5, and then the tool spindle 51 is moved to a predetermined position and a machining operation using the fifth tool T5 is started. In this way, a workpiece is machined while 5 types of tools are changed by the tool changer 1 of this embodiment.

As described above, in the tool changer 1 of this embodiment, the support shaft 10 can be rotated in both of the normal and reverse directions by the drive mechanism 13. Therefore, when at least one of the tool spindle 51, the standby position pot 40, and the provisional pot 41 is holding a tool and the held tool is going to be held by the tool holding units 16, the support shaft 10 can be rotated in the reverse direction in advance to take a run-up to swinging the tool holding unit 16 on the tool, which makes the time required for tool change shorter than that in the case where the support shaft is rotated only in one direction Further, according to the tool changer 1 of this embodiment, it is possible to hold a tool to be used after a next tool in advance because the tool changer 1 includes three tool change arms 15a, 15b, and 15c. For example, in a case where the time needed for the machining operation using the second tool T2 is shorter than the time needed for transferring the standby position pot 40 holding the first tool T1 to the tool magazine 2 and then transferring a tool pot 3 holding the third tool T3 from the tool magazine 2 to the standby position, the third tool T3 can be held by one of the tool holding units 16 in advance; therefore, it is possible to attach the third tool T3 to the tool spindle 51 and start the machining operation using the third tool T3 without the occurrence of a waiting time after the machining operation using the second tool T2 is finished.

Further, in the tool changer 1 of this embodiment, the provisional placing pot 41 is disposed at a position which, when one of the tool holding units 16 is positioned at a position corresponding to the spindle (tool change position) and another one of the tool holding units 16 is positioned at a position corresponding to the standby position pot (standby position), corresponds to the remaining tool holding unit 16 (provisional placing position). Therefore, for example, as shown in FIG. 5(b), when the first tool holding unit and the second tool holding unit are positioned at the standby position and the tool change position, respectively, and the first tool T1 is held by the standby position pot 40 and the second tool T2 is attached to the tool spindle 51, the third tool T3 can be held by the provisional placing pot 41 disposed at a position corresponding to the third tool holding unit. Therefore, the third tool holding unit does not have to hold the third tool T3 when the support shaft 10 is rotated in the reverse direction thereafter. Therefore, it is not necessary to provide a complicated mechanism for non-releasably locking the holding of a tool of each tool holding unit separately, which enables cost reduction.

Further, in the tool changer 1 of this embodiment, because a so-called servo motor is used in the drive mechanism 13, the tool change arms can be flexibly driven as necessary. Therefore, when holding a tool, the tool change arm can start the holding operation immediately after taking a minimum required run-up, which makes the tool change time shorter.

Thus, one embodiment of the present disclosure has been described; however, the present disclosure is not limited thereto and includes other possible specific embodiments.

For example, although the tool changer 1 in the above embodiment is configured to have three tool change arms 15a, 15b, and 15c, the present disclosure is not limited thereto and the tool changer 1 may be configured to have three or more tool change arms. Note that, in such a case, it is preferred that provisional placing pots are provided at positions which, when the tool holding unit of one of the tool change arms is positioned at the tool change position and the tool holding unit of another one of the tool change arms is positioned at the standby position, correspond to the tool holding units of the remaining tool change arms (provisional placing positions).

Further, although the tool changer 1 in the above embodiment has the configuration in which the provisional placing pot 41 is provided so that, for example, as shown in FIG. 5(b), the third tool T3 held by the tool holding unit 16 of the third tool change arm 15c can be held by the provisional placing tool pot 41 when the second tool T2 held by the tool holding unit 16 of the second tool change arm 15b is attached to the tool spindle 51 and the first tool T1 held by the tool holding unit 16 of the first tool change arm 15a is held by the standby position pot 40, a configuration is possible in which the provisional placing pot 41 is not provided.

Note that, in such a case, it is preferred that the locking mechanism 45 is configured to separately switch the tool holding state of each of the tool holding units 16 of the tool change arms 15a, 15b, and 15c between the locked state and the released state. In this configuration, for example, the third tool T3 can be prevented from falling off by bringing the holding of the third tool T3 by the tool holding unit 16 of the third tool change arm 15c into the locked state, instead of by causing the third tool T3 to be held by the provisional placing pot 41.

Furthermore, although, in the above embodiment, the three tool change arms 15a, 15b, and 15c are spaced apart at equal intervals, the present disclosure is not limited thereto.

Further, although, in the above embodiment, one of the tool pots 3 held by the holding bases 8 of the tool magazine 2 is transferred to the standby position by the tool transfer mechanism 45 and the tool pot 3 disposed at the standby position is referred to as "standby position pot 40", the present disclosure is not limited thereto. For example, a configuration is possible in which a standby position pot capable of holding a tool is previously provided at the standby position so that it is supported on the machine tool by an appropriate support member and the tool transfer mechanism 45 is configured to pull only a tool out of a tool pot 3 indexed at the index position in the tool magazine 2 and cause the pulled tool to be held by the standby position pot.

Further, an example of the process of machining a workpiece with the tool changer 1 is shown in the above embodiment; a workpiece may be machined by following the same procedure as that shown in FIGS. 5(a) to 6(b) and then following the procedure shown in FIG. 7, which is described below. Note that, also in the following description, rotating the support shaft 10 in the clockwise direction with respect to the figures is expressed as "rotating the support shaft 10 in the normal direction" and rotating the support shaft 10 in the counterclockwise direction is expressed as "rotating the support shaft 10 in the reverse direction", similarly to the foregoing description.

As shown in FIG. 6(b), which has been described above, after the fourth tool T4 is attached to the tool spindle 51 and the second tool T2 and the third tool T3 are respectively held by the standby position pot 40 and the provisional placing pot 41, the support shaft 10 is rotated in the reverse direction until the third tool holding unit is positioned in a position at which it does not interfere with the fourth tool T4, and then the tool spindle 51 is moved to a predetermined position and the machining operation using the fourth tool T4 is started. Further, simultaneously with the movement of the tool spindle 51 or during the machining operation using the fourth tool T4, the tool transfer mechanism 45 puts the standby position pot 40 holding the second tool T2 into the tool magazine 2 and transfers an empty tool pot 3 which is indexed at the index position in the tool magazine 2 to the standby position.

Subsequently, the support shaft 10 is rotated in the normal direction to cause the first tool holding unit to hold the third tool T3, and then the support shaft 10 is moved to the pulling position to pull the third tool T3 out of the provisional placing pot 41. Thereafter, as shown in FIG. 7(a), the support shaft 10 is rotated in the reverse direction to move the first tool holding unit to the standby position.

Figure 7:
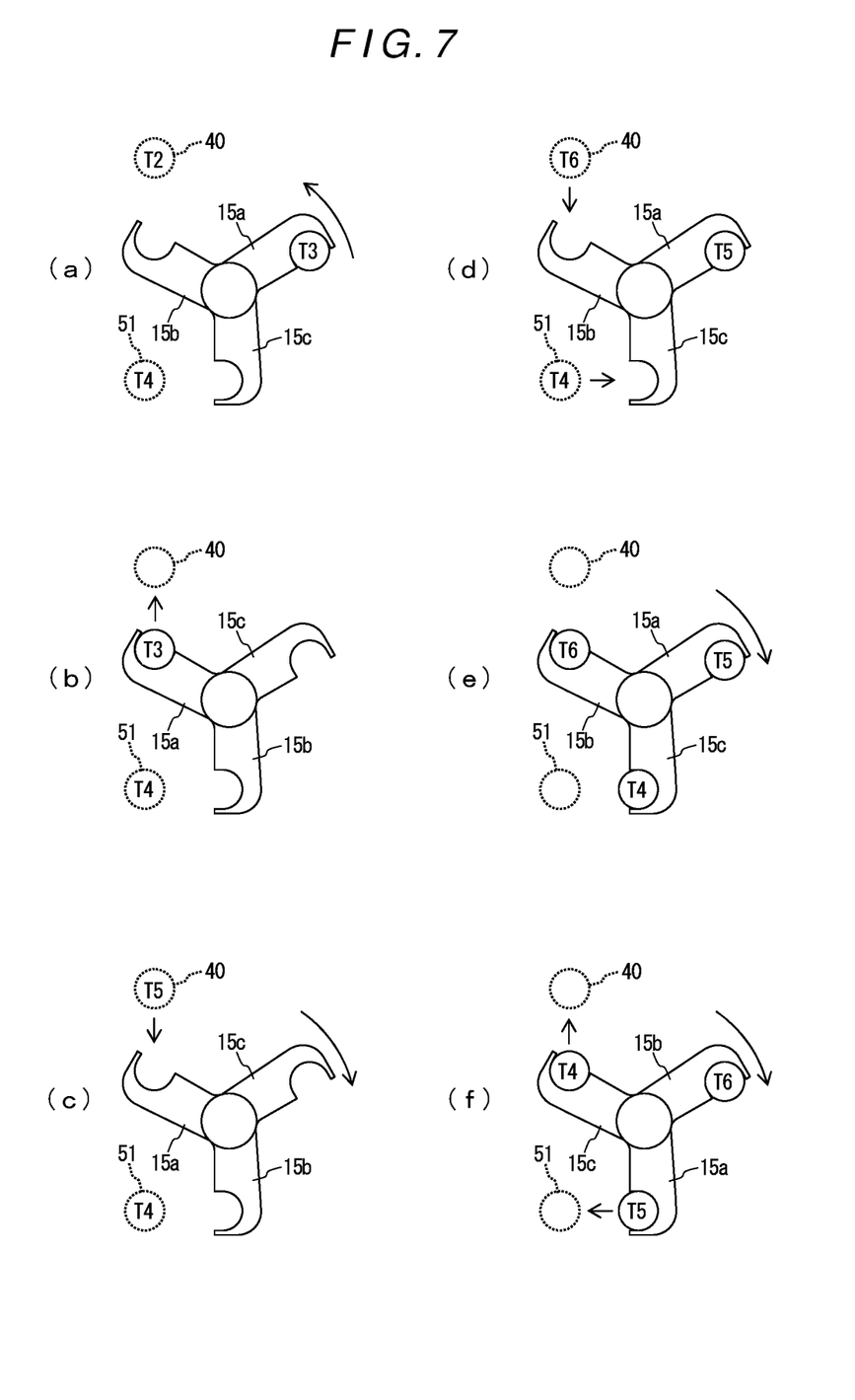
FIG. 7 is an illustration for describing another tool changing process performed by the tool changer according to the embodiment.

Next, the support shaft 10 is moved to the inserting position to cause the third tool T3 to be held by the standby position pot 40 (see FIG. 7(b)), and then the support shaft 10 is rotated in the reverse direction to release the holding of the third tool T3 by the first tool holding unit. Thereafter, the standby position pot 40 holding the third tool T3 is transferred from the standby position to the tool magazine 2 by the tool transfer mechanism 45, and then a tool pot 3 holding the fifth tool T5 is indexed to the index position in the tool magazine 2 and the tool pot 3 is transferred from the tool magazine 2 to the standby position.

Subsequently, as shown in FIG. 7(c), the support shaft 10 is rotated in the normal direction, whereby the first tool holding unit is swung on the fifth tool T5 and the fifth tool T5 is held by the first tool holding unit. Thereafter, the support shaft 10 is moved to the pulling position to pull the fifth tool T5 out of the tool pot 3 held by the standby position pot 40, and then the support shaft 10 is rotated in the normal direction to move the first tool holding unit to the provisional placing position.

Next, the support shaft 10 is moved to the pulling position to cause the fifth tool T5 to be held by the provisional placing pot 41, and then the support shaft 10 is rotated in the reverse direction to release the holding of the fifth tool T5 by the first tool holding unit. Subsequently, the standby position pot 40 that used to hold the fifth tool T5 is transferred from the standby position to the tool magazine 2 by the tool transfer mechanism 45, and then a tool pot 3 holding a sixth tool T6 is indexed to the index position in the tool magazine 2 and the tool pot 3 is transferred to the standby position (see FIG. 7(d)).

After the machining operation using the fourth tool T4 is finished, the tool spindle 51 is moved to the tool change position and the support shaft 10 is rotated in the normal direction, whereby the third tool holding unit is swung on the fourth tool T4 and the forth tool T4 is held by the third tool holding unit, the second tool holding unit is swung on the sixth tool T6 and the sixth tool T6 is held by the second tool holding unit, and the first tool holding unit is swung on the fifth tool T5 and the fifth tool T5 is held by the first tool holding unit. Subsequently, the support shaft 10 is moved to the pulling position to pull the fourth tool T4 out of the tool spindle 51, pull the sixth tool T6 out of the standby position pot 40, and pull the fifth tool T5 out of the provisional placing pot 41 (see FIG. 7(e)).

Subsequently, as shown in FIG. 7(f), the support shaft 10 is rotated in the normal direction to move the first tool holding unit to the tool change position, move the third tool holding unit to the standby position, and move the second tool holding unit to the provisional placing position. Thereafter, the support shaft 10 is moved to the inserting position to attach the fifth tool T5 to the tool spindle 51 and cause the fourth tool T4 and the sixth tool T6 to be held by the standby position pot 40 and the provisional placing pot 41, respectively. Thereafter, the support shaft 10 is rotated in the reverse direction until the first tool holding unit is positioned in a position at which it does not interfere with the fifth tool T5, and then the tool spindle 51 is moved to a predetermined position and a machining operation using the fifth tool T5 is started.

Thus, in the case where a machining operation using one tool, i.e. the machining operation using the fourth tool T4 in this example, is performed for a relatively long period of time, it is possible to cause the tool holding units to hold a tool to be used next (the fifth tool T5) and a tool to be used after the next tool (the sixth tool T6) during the machining operation using the fourth tool T4, which enables the subsequent machining operations to be performed smoothly.

What is claimed is:

1. A tool changer including a tool magazine storing a plurality of tools, and disposed at a tool change position in a machine tool for attaching a given tool selected from the plurality of tools stored in the tool magazine to a spindle, the tool changer comprising:
    a support shaft disposed to have a center axis parallel to an axis of the spindle and provided to be rotatable about the center axis and to be movable in approaching and separating directions relative to the spindle, the approaching and separating directions being parallel to the axis of the spindle;
    a drive mechanism for rotating the support shaft in clockwise and counterclockwise directions about the center axis and moving the support shaft in the approaching and separating direction along the axis of the spindle;
    a first tool change arm, a second tool change arm, and a third tool change arm, wherein the first tool change arm, the second tool change arm, and the third tool change arm extend in respective radial directions with respect to the center axis of the support shaft, are positioned on a common pitch circle having its center on the center axis of the support shaft, and are disposed in a common plane perpendicular to the center axis of the support shaft, and each of the first, second, and third tool change arms have a tool holding unit that is formed as an opening within a respective side surface thereof, the respective side surfaces corresponding to a clockwise direction side or a counterclockwise direction side of the corresponding tool change arm;
    a standby position pot provided at a position for taking the given tool in and out of the tool magazine;
    a tool transfer mechanism for transferring the given tool between the tool magazine and the standby position pot; and
    a provisional placing pot,
    the tool changer being controlled such that, when the support shaft is rotated in the clockwise direction or counterclockwise direction corresponding to the respective side surfaces of the first, second and third tool change arms in which the corresponding tool holding units thereof are formed, the first, second and third tool change arms are swung such that the given tool attached to the spindle, a second tool that is held by the standby position pot and is to be attached to the spindle subsequent to the selected tool, and a third tool that is held by the provisional placing pot and is to be attached to the spindle subsequent to the second tool, are simultaneously and respectively held by the tool holding unit of the first tool change arm, the tool holding unit of the second tool change arm, and the tool holding unit of the third tool change arm.

2. The tool changer according to claim 1, wherein:
    the first, second, and third tool change arms are disposed at equal intervals from each other along the clockwise and counterclockwise directions.

3. The tool changer according to claim 2, wherein, when the corresponding tool holding unit of the first tool change arm is positioned at a position corresponding to the spindle, the corresponding tool holding unit of the second tool change arm is positioned at a position corresponding to the standby position pot, and the corresponding tool holding unit of the third tool change arm is positioned at a position corresponding to the provisional placing pot.

4. The tool changer according to claim 3, wherein
    each of the first, second, and third tool change arms has a respective locking mechanism for allowing the corresponding tool held by the tool holding unit thereof to be released at least when the support shaft approaches the spindle, and for non-releasably locking the corresponding tool held by the tool holding unit thereof when the corresponding tool held by the tool holding unit thereof is not allowed to be released, and
    the respective locking mechanisms of the first, second, and third tool change arms synchronously operate.

* * * * *